(12) United States Patent
Ogawa (10) Patent No.: US 9,604,633 B2
(45) Date of Patent: Mar. 28, 2017

(54) TRAVEL SUPPORT DEVICE, TRAVEL SUPPORT METHOD, AND DRIVE SUPPORT SYSTEM (71) Applicant: TOYOTA JIDOSHA KABUSHIKI KAISHA, Toyota-shi, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/767,076

(22) PCT Filed: Oct. 8, 2014

(86) PCT No.: PCT/JP2014/005125
§ 371 (c)(1),
(2) Date: Aug. 11, 2015

(87) PCT Pub. No.: WO2015/059883
PCT Pub. Date: Apr. 30, 2015

(65) Prior Publication Data
US 2016/0221567 A1 Aug. 4, 2016

(30) Foreign Application Priority Data
Oct. 21, 2013 (JP) .................................. 2013-218429

(51) Int. Cl.
*B60L 9/00* (2006.01)
*B60W 20/12* (2016.01)
*B60W 20/40* (2016.01)
*B60W 20/14* (2016.01)
(Continued)

(52) U.S. Cl.
CPC ............ *B60W 20/12* (2016.01); *B60K 6/442* (2013.01); *B60W 20/14* (2016.01); *B60W 20/40* (2013.01); *G01C 21/3469* (2013.01); *B60W 2510/244* (2013.01); *B60W 2550/143* (2013.01); *B60W 2550/402* (2013.01); *B60Y 2200/92* (2013.01);
(Continued)

(58) Field of Classification Search
CPC ............... G01C 21/26; G01C 21/3667; B60W 2550/402; B60W 2510/244
USPC .......................... 701/22; 180/65.29; 320/112
See application file for complete search history.

(56) References Cited

U.S. PATENT DOCUMENTS

| 5,892,346 A | * | 4/1999 | Moroto | .................. | B60K 6/485 |
| | | | | | 318/139 |
| 2015/0057860 A1 | * | 2/2015 | Katakura | ................. | B60K 6/48 |
| | | | | | 701/22 |

FOREIGN PATENT DOCUMENTS

| JP | 2009-012605 A | 1/2009 |
| JP | 2015-030407 A | 2/2015 |
| WO | 2015/019142 A1 | 2/2015 |

* cited by examiner

Primary Examiner — Gertrude Arthur Jeanglaud
(74) Attorney, Agent, or Firm — Oliff PLC (57) ABSTRACT

A travel route from the current location to the destination is divided into a plurality of sections. Travel modes of a vehicle include an EV mode, which uses the motor as the drive source, and an HV mode, which uses at least the internal combustion engine as the drive source. A road load for traveling each section in the EV mode is set. A travel support device includes a planner and a setter. The planner plans, for each section, the travel mode by selecting one of the EV mode, and an HV mode. When a planned section of the travel mode is switched from an EV mode-planned section to an HV mode-planned section, the setter sets the travel mode to continue traveling in the EV mode, on the condition that a remaining charge of the battery is less than a threshold.

10 Claims, 5 Drawing Sheets

(51) Int. Cl.
 *B60K 6/442* (2007.10)
 *G01C 21/34* (2006.01)
(52) U.S. Cl.
 CPC ..... *B60Y 2300/182* (2013.01); *Y02T 10/7258* (2013.01); *Y10S 903/93* (2013.01)

TRAVEL SUPPORT DEVICE, TRAVEL SUPPORT METHOD, AND DRIVE SUPPORT SYSTEM

TECHNICAL FIELD

The present invention relates to a travel support device that manages adaptation of a plurality of travel modes of a vehicle, a travel support method, and a drive support system having a travel support function.

BACKGROUND ART

Conventionally, as a vehicle provided with a plurality of travel modes as described above, a hybrid vehicle that uses both an internal combustion engine and a motor as its drive sources is known. The hybrid vehicle has a plurality of travel modes including a mode that uses only the internal combustion engine or both the internal combustion engine and the motor (HV mode), and a mode that uses only the motor to travel by stopping the internal combustion engine (EV mode). Further, a travel support device that includes a navigation system and the like to be installed in the hybrid vehicle calculates a travel route from a current location to a destination based on information such as map information and road traffic information, and selects a travel mode to be adapted to each of sections that are to be dividing units of the travel route. For example, Patent Document 1 discloses an example of a controller of a vehicle having such a travel support function.

CITATION LIST

Patent Literature

[PTL 1]
Japanese Laid-Open Patent Publication No. 2009-12605

SUMMARY OF INVENTION

Technical Problem

Incidentally, in a controller of a vehicle described in Patent Document 1, travel modes of the respective sections in a travel route are set by considering the entire energy balance of the travel route so that the remaining charge of the battery, which is a secondary battery, becomes a value close to the lower limit at the destination. However, the prediction may be incorrect depending on factors such as changes in the traffic flow, and the remaining charge of the battery may decrease faster than the prediction. In such a case, even if the HV mode is switched to the EV mode, the travel mode may be instantly switched back to the HV mode in the section for which the travel mode is planned to be the EV mode when the remaining charge of the battery reaches the lower limit. Due to this, an uncomfortable sensation may be felt by the driver.

Such a problem is a common problem in general for devices and methods that assign travel modes to a vehicle having a plurality of travel modes with different energy balance.

An objective of the present invention is to provide a travel support device and a travel support method that support a vehicle to travel through a smooth switching between an EV mode and an HV mode, and a drive support system having the travel support function.

Solution to Problem

To achieve the foregoing objective and in accordance with a first aspect of the present invention, a travel support device is provided that supports a vehicle having an internal combustion engine and a motor, which uses a battery, as drive sources to move from a current location to a destination. A travel route from the current location to the destination is divided into a plurality of sections. Travel modes of the vehicle include an EV mode, which uses the motor as the drive source, and an HV mode, which uses at least the internal combustion engine as the drive source. A road load for traveling each section in the EV mode is set. The travel support device includes a planner and a setter. The planner that plans, for each section, the travel mode by selecting one of the EV mode and the HV mode. When a planned section of the travel mode is switched from an EV mode-planned section to an HV mode-planned section, the setter sets the travel mode to continue traveling in the EV mode on condition that a remaining charge of the battery is less than a threshold.

To achieve the foregoing objective, a second aspect of the present invention provides a travel support method for supporting a movement of a vehicle having an internal combustion engine and a motor, which uses a battery, as drive sources from a current location to a destination. A travel route from the current location to the destination is divided into a plurality of sections. Travel modes of the vehicle include an EV mode, which uses the motor as the drive source, and an HV mode, which uses at least the internal combustion engine as the drive source. A road load for traveling each section in the EV mode is set. The travel support method includes: planning the travel mode by selecting one of the EV mode and the HV mode; and when a planned section of the travel mode is switched from an EV mode-planned section to an HV mode-planned section, setting the travel mode to continue traveling in the EV mode on condition that a remaining charge of the battery is less than a threshold.

To achieve the foregoing objective, a drive support system supports driving of a vehicle based on one travel mode selected from among a plurality of different travel modes, the selected mode having been planned for each of a plurality of sections that are obtained by dividing a travel route from a current location to a destination of the vehicle including an internal combustion engine and a motor as drive sources. The drive support system includes the travel support device according to the above described first aspect as a travel support device for planning the one travel mode selected from among the plurality of travel modes for each section of the travel route and setting the travel mode as needed.

DESCRIPTION OF EMBODIMENTS

First Embodiment

Hereinbelow, a travel support device, a travel support method, and a drive support system according to a first embodiment will be described with reference to FIGS. 1 to 4. The travel support device, the travel support method, and the drive support system of the present embodiment are adapted to a hybrid vehicle that uses an electric motor, which uses a battery consisting of a secondary battery as a power source, and an internal combustion engine, which uses gasoline or other fuel as a power source, as drive sources.

Figure 1:
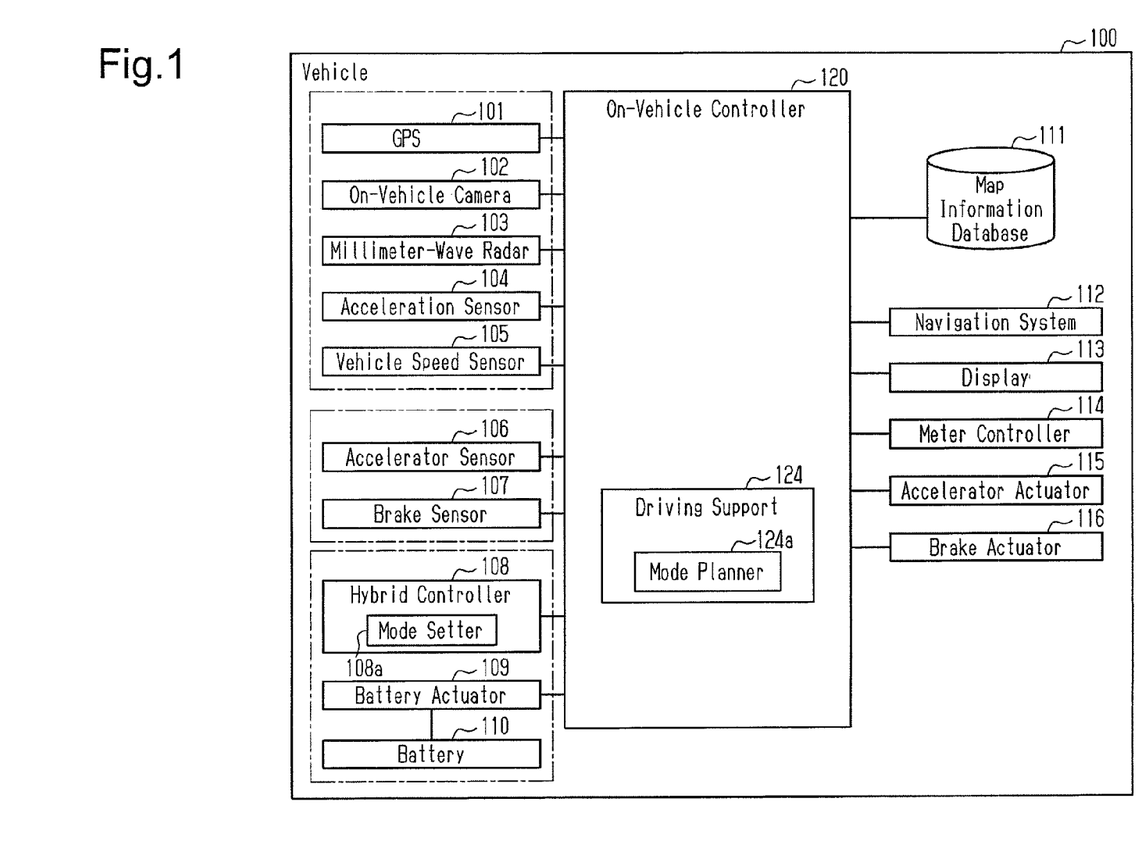
FIG. 1 is a block diagram showing a schematic configuration of a travel support device according to a first embodiment.

As shown in FIG. 1, a vehicle 100 according to the present invention has as means for detecting a traveling state of the vehicle 100, for example, a GPS 101, on-vehicle camera 102, a millimeter wave radar 103, an acceleration sensor 104, a vehicle speed sensor 105, and the like. The GPS 101, the on-vehicle camera 102, the millimeter wave radar 103, the acceleration sensor 104, and the vehicle speed sensor 105 are connected to an on-vehicle controller 120, which exerts various vehicle controls and the like via an on-vehicle network such as a control area network (CAN). Further, the on-vehicle controller 120 is an electronic control unit (ECU), and includes a small computer including an arithmetic device and a storage device (memory). The on-vehicle controller 120 can perform various control processes by executing programs stored in the storage device, and calculating parameters with the arithmetic device.

The GPS 101 receives a GPS satellite signal for detecting the absolute location of the vehicle 100, and detects the latitude and longitude of the vehicle 100 based on the received GPS satellite signal. The GPS 101 outputs location information, which is information indicating the detected latitude and longitude of the vehicle 100, to the on-vehicle controller 120. The on-vehicle camera 102 images the surrounding environment of the vehicle 100 and outputs image formed from image data to the on-vehicle controller 120. The millimeter wave radar 103 detects, for example, the presence of an object in the vicinity of the vehicle 100 by using radio waves in the millimeter wave band and outputs a signal corresponding to the result of this detection to the on-vehicle controller 120.

The acceleration sensor 104 detects the acceleration of the vehicle 100 and outputs a signal corresponding to the detected acceleration to the on-vehicle controller 120. The vehicle speed sensor 105 detects the rotating speed of a wheel of the vehicle 100 and outputs a signal corresponding to the detected rotating speed to the on-vehicle controller 120.

An accelerator sensor 106 detects the degree of accelerator operation, which is changed by an accelerator pedal operation performed by the driver, and outputs a signal corresponding to the degree of accelerator operation to the on-vehicle controller 120. A brake sensor 107 detects the degree by which a brake pedal is depressed by the driver, and outputs a signal corresponding to this detected degree of depression, to the on-vehicle controller 120.

The vehicle 100 is also provided with an accelerator actuator 115, which controls the driving state of the engine, and a brake actuator 116, which controls the brake. The accelerator actuator 115 and the brake actuator 116 are electrically connected to the on-vehicle controller 120. The accelerator actuator 115 controls the engine based on a control amount for the engine, which is calculated by the on-vehicle controller 120, according to the detection value of the accelerator sensor 106. The brake actuator 116 controls the brake based on a control amount for the brake, which is calculated by the on-vehicle controller 120, according to the detection value of the brake sensor 107.

Further, the vehicle 100 includes a battery 110, which is a power source of an electric motor serving as a drive source, and a battery actuator 109, which controls charge/discharge of the battery 110. The battery actuator 109 is electrically connected to the on-vehicle controller 120. The battery actuator 109 manages the state of the battery 110 such as the charge/discharge state. Further, the battery actuator 109 drives the electric motor by controlling the discharge of the battery 110, and charges the battery 110 by regeneration of the electric motor.

Additionally, the vehicle 100 is provided with a hybrid controller 108, which controls the respective driving states of the drive sources, or the engine and the motor. The hybrid controller 108 is electrically connected to the on-vehicle controller 120. That is, the hybrid controller 108 is electrically connected to the battery actuator 109, the accelerator actuator 115, and the brake actuator 116 via the on-vehicle controller 120. Further, the hybrid controller 108 is also an ECU, and includes a small computer including an arithmetic device and a storage device. The hybrid controller 108 can perform various control processes s by executing programs stored in the storage device, and calculating parameters by the arithmetic device.

Based on, for example, the detection results of the acceleration sensor 104, the vehicle speed sensor 105, and the accelerator sensor 106 input from the on-vehicle controller 120, the hybrid controller 108 determines driving force distribution of the internal combustion engine and the electric motor, or an output ratio. Particularly, the hybrid controller 108 adjusts the remaining charge of the battery 110 that is an energy remaining charge of the battery by changing the driving force distribution of the internal combustion engine and the electric motor.

Based on the driving force distribution, the hybrid controller 108 generates a control instruction for the battery actuator 109 related to discharge and the like of the battery 110, and information related to a control amount for the internal combustion engine to be calculated by the on-vehicle controller 120. Further, the hybrid controller 108 determines distribution of braking force of the brake and the electric motor based, for example, on detection results of the acceleration sensor 104, the vehicle speed sensor 105, and the brake sensor 107 input from the on-vehicle controller 120. The hybrid controller 108 generates a control instruction for the battery actuator 109 related to the charge and the like of the battery 110 and information related to a control amount for the brake to be calculated by the on-vehicle controller 120 based on the braking force distribution. That is, the hybrid controller 108 controls the charge/discharge of the battery 110 by outputting the generated control instructions to the battery actuator 109. Due to this, the electric motor, which uses the battery 110 as the power source (electric power source), is driven by the discharge of the battery 110, and the battery 110 is charged by the regeneration of the electric motor. Further, the on-vehicle controller 120 can monitor executing states of a hybrid control, and charged rate of the battery 110.

The vehicle 100 according to the present embodiment has, for example, an EV mode, in which the vehicle 100 runs with the motor as a drive source, and an HV mode, in which the vehicle 100 runs with a motor and an engine as drive sources. The hybrid controller 108 according to the present embodiment exerts control in which switching between the EV mode and the HV mode is executed according to, for example, the result of selection made by the driver of the vehicle 100. Additionally, the hybrid controller 108 according to the present embodiment has, for example, an automatic switching function for the EV mode and the HV mode, and exerts control for switching between the EV mode and the HV mode based on information indicating the travel route of the vehicle 100 and/or movement cost taken for the travel route, which is input from the on-vehicle controller 120. A road load is the amount of load amount per unit distance in respective sections, and is an average load amount required for travelling a section. An accumulated value of the road load required in completely traveling the section is defined as consumption energy.

The vehicle 100 is provided with a map information database 111, in which map data are registered. The map data are data related to geography such as roads. Information related to locations such as latitude and longitude is registered together with data by which the geography can be also displayed in the map data. Further, the map data may have at least one of intersection names, road names, district names, directional guides, facility information, and the like registered therein.

Further, the map information database 111 includes node data that is information related to nodes indicating locations on roads, and link data that is information related to links as sections between two nodes. A node is set on the road at a location of a specific traffic element such as an intersection, a signal, a curve, and the like, and at a location where the number of lanes is changed. The node data includes location information of nodes, and road information of the locations. A link is set as a section between two nodes, which is divided by the two nodes. The link data includes information of the two nodes, and road information of the section of the link. The road load can be acquired or calculated from road load information included in the link data. The road information of the section of the link includes information such as a starting point, an ending point, a distance, a route, and undulations. Further, the link data may include various types of data, such as cost data including the road load of the section of the link, road data including road types, mark data indicating a specific location, intersection data indicating information of an intersection, and facility data indicating information of a facility.

Among these, the node data is composed of, for example, data indicating: node characteristics such as: node IDs, which are identification numbers of nodes; coordinates of nodes; link IDs of all links connected to the nodes; node types indicating the types of intersections, junctions, and the like; and image IDs that are identification numbers of images representing the nodes.

The link data are composed of, for example, data indicating: link IDs, which are identification numbers of the links; link lengths; node IDs of nodes connecting to initial points and terminal points; road types such as highways, toll roads, ordinary roads, urban/suburban roads, and mountain roads; road widths; the number of lanes; traveling times along links; legal traveling speeds; and road gradient. Moreover, the link data may include data indicating averages, maximum values, minimum values, and the like of moving time, moving speed, consumed fuel amount, and consumed power amount, and the like as road load information that is a required output of the vehicle 100 in each link. The consumed power amount is a power amount that is consumed by the electric motor when the vehicle 100 travels in the EV mode. The road load of the link (section) is acquired or calculated based on such road load information. The road load is an average value in a link (section), and a unit of the road load is [kW]. Further, the consumption energy as the accumulated value of the road load required in completely traveling the link can be calculated from the road load and a link length (section length).

The vehicle 100 has a navigation system 112, which provides route guidance or the like. The navigation system 112 acquires the current location point (latitude and longitude) of the vehicle 100 from the on-vehicle controller 120 in which a detection result of the GPS 101 is input. When a destination is set by the driver, the navigation system 112 specifies the latitude and longitude of this destination. The navigation system 112 obtains the latitude and longitude information of the current location of the vehicle 100 from the on-vehicle controller 120, to which the detection result of the GPS 101 is input. Then, referring to the map information database 111, the navigation system 112 searches one or more travel routes from the current location of the vehicle 100 to its destination. The navigation system 112 also calculates, for example, the road load, the moving time, the moving speed, the fuel consumption, and the electricity consumption for one or more travel routes searched. Then, the navigation system 112 outputs information indicating the travel route/routes searched and the road load, the moving time, the moving speed, the fuel consumption, and the electricity consumption calculated, to a display 113 provided in the passenger compartment and formed from a liquid crystal display and the like.

Additionally, the vehicle 100 is provided with a meter controller 114, which controls the display states of meters displayed on an instrument panel provided on a dashboard. The meter controller 114 obtains data indicating, for example, the charged and discharged states and the like of the battery 110 from the on-vehicle controller 120, and visually displays, for example, an energy flow in the vehicle 100 based on the obtained data. The energy flow is a flow of energy in the vehicle 100 that is generated by the charge/discharge of the battery 110, and the driving force/regeneration of the electric motor. The energy flow may include a flow of energy in the vehicle 100 generated by the driving force of the internal combustion engine.

When the travel route is input, the on-vehicle controller 120 assigns travel modes to each section of the travel route. The on-vehicle controller 120 includes a driving support 124, which supports the assignment of the travel modes corresponding to the travel route. The driving support 124 acquires the travel route information to the destination point set by the driver from the navigation system 112.

Further, the driving support 124 includes a mode planner 124a, which executes planning of travel mode to be assigned to the sections of the acquired travel route. The mode planner 124a configures a part of the travel support device, and its function is exhibited by execution process and the like of a program in the on-vehicle controller 120. The mode planner 124a has a function to plan the travel modes of the sections corresponding to the road loads of the respective sections in the travel route.

Generally, efficiency tends to improve by adapting the traveling by the electric motor to a section having a small road load. Further, the efficiency tends to improve by adapting the traveling by the internal combustion engine to a section having a large road load. Thus, the on-vehicle controller 120 assigns the EV mode to a section having a small road load, and assigns the HV mode to a section having a large road load.

Among a plurality of target sections, the mode planner 124a assigns the EV mode to sections in ascending order of road load by comparing the road loads of those sections. Further, the mode planner 124a accumulates the consumption energy of the sections to which the EV mode was assigned, and subtracts the same from the remaining energy of the battery 110. Then, the mode planner 124a continues assigning the EV mode to each section so that the accumulated consumption energy does not exceed the remaining energy of the battery 110. Due to this, the mode planner 124a assigns the EV mode to the sections having a relatively low road load among the sections of the travel route. Further, the mode planner 124a assigns the HV mode to the sections to which the EV mode is not assigned.

The mode planner 124a outputs the travel modes planned for each of the sections of the travel route as above to the display 113, and displays the planned travel mode of the traveling section on the display 113.

The hybrid controller 108 identifies the section where the vehicle 100 is currently traveling by suitably acquiring currently traveling location information from the on-vehicle controller 120, and causes the vehicle 100 to travel in the travel mode planned for the identified section. That is, the hybrid controller 108 switches the travel mode of the vehicle 100 to the EV mode or the HV mode assigned to the section each time the travel section of the vehicle 100 changes. Due to this, the vehicle 100 travels in the travel mode planned for the section where the vehicle 100 is currently traveling. Further, the hybrid controller 108 includes a mode setter 108a that performs setting of a travel mode plan assigned to sections of the acquired travel route. The mode setter 108a configures a part of the travel support device. The functions of the mode setter 108a are exhibited by execution of programs in the hybrid controller 108. The mode setter 108a has a function to set a travel mode of each section in accordance with the remaining charge of the battery 110. The "setting" performed by the mode setter 108a includes "changing" of the travel mode, "updating" of the travel mode, and "resetting" of the travel mode.

When the battery 110 is consumed greatly during traveling in the EV mode and the vehicle 100 enters a section that is planned to be in the HV mode in a state where the remaining charge of the battery 110 is scarce, and thereafter the vehicle 100 enters a section that is planned to be in the EV mode, the travel mode is switched instantly to the HV mode. A so-called hunting of the travel mode may occur.

Thus, when a planned section of the travel mode is switched from the EV mode-planned section to the HV mode-planned section, the mode setter 108a sets the travel mode to continue traveling in the EV mode on condition that the remaining charge of the battery 110 is scarce. The mode setter 108a executes a travel mode setting in accordance with a predetermined condition. The predetermined condition includes that the remaining charge of the battery 110 is less than a threshold, the travel mode of the currently traveling section is the EV mode, and the next travel section is planned to be in the HV mode, or a combination of these.

Further, since the battery 110 will be used up by continuing to travel in the EV mode, the vehicle 100 cannot travel the subsequent sections, which are planned to be in the EV mode, in the EV mode. Thus, the mode setter 108a sets the travel mode of the section planned to be in the EV mode in the HV mode for sections subsequent to the section of which travel mode was set from the HV mode to the EV mode. The mode setter 108a outputs the travel mode that was set for each section in the travel route as above on the display 113, and causes the travel mode set to the traveling section to be displayed on the display 113.

Next, an example of planning of the travel mode and the travel route to be set as aforementioned will be described with reference to FIG. 2.

Figure 2:
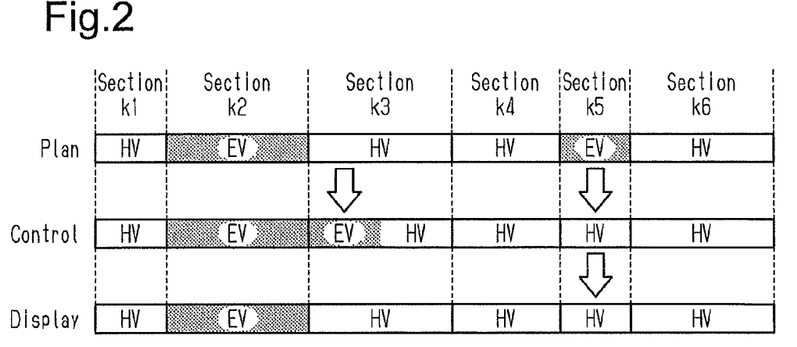
FIG. 2 is a diagram exemplifying a part of a travel route to be planned by the travel support device of the first embodiment.

As shown in FIG. 2, the travel route searched by the navigation system 112 includes sections, namely a first section k1 to a sixth section k6. Further, information related to road loads, consumption energy and the like in each section of the first section k1 to sixth section k6 is assumed to have been acquired from the map information database 111. The mode planner 124a performs planning of the travel modes based on the remaining charge of the battery 110, and the road load and the consumption energy of the first section k1 to sixth section k6. As a result, the travel mode of the second section k2 and the travel mode of the fifth section k5 are planned to be the EV mode. Further, the travel mode of the first section k1, the travel mode of the third section k3, the travel mode of the fourth section k4, and the travel mode of the sixth section k6, which are the remaining sections, are planned to be the HV mode.

Next, an example of the travel mode planning method by the driving support 124 will be described with reference to FIG. 3. The driving support 124 performs planning by assigning the travel modes to respective sections in the travel route each time a travel route is transmitted from the navigation system 112.

Figure 3:
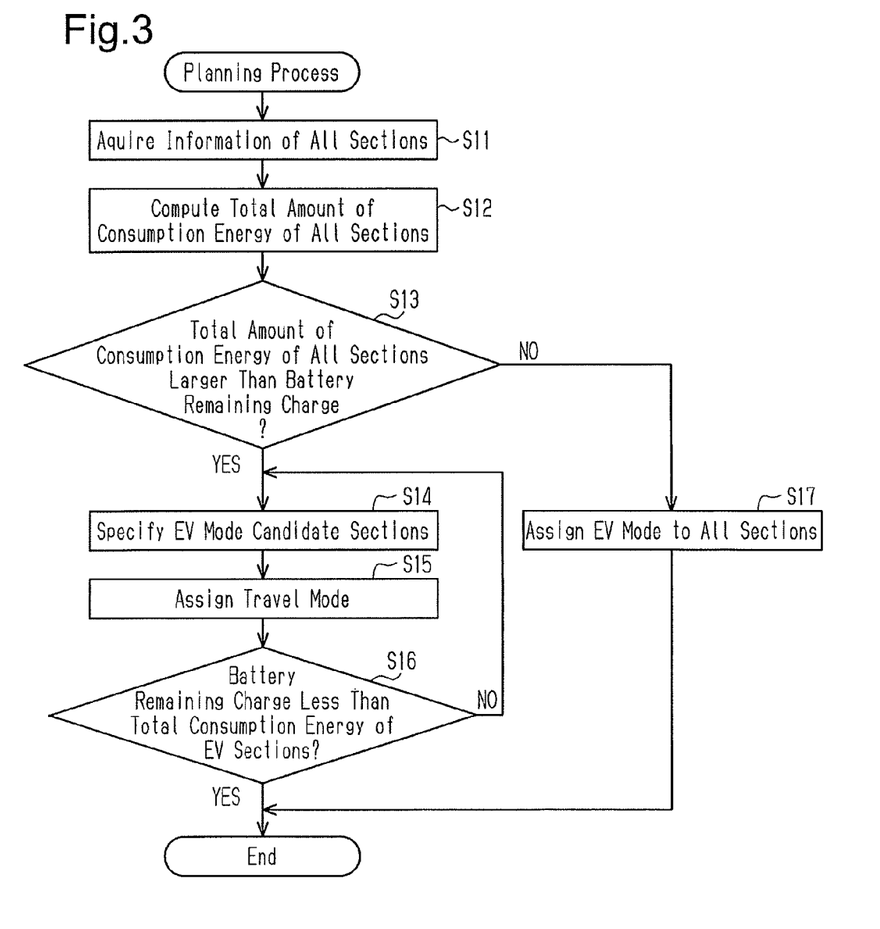
FIG. 3 is a flowchart showing a travel mode planning process by the travel support device of the first embodiment.

As shown in FIG. 3, when a destination location is set by the navigation system 112, the driving support 124 acquires route information for each section in the travel route (step S11). Further, the driving support 124 computes the total amount of the consumption energy based on the acquired information of each section (step S12). The driving support 124 determines whether or not the total amount of the consumption energy of the sections is larger than the remaining charge of the battery 110 (step S13). That is, the mode planner 124a determines whether or not all of the sections can be traveled in the EV mode. In a case of determining that the total amount of the consumption energy of the sections is not larger than the remaining charge of the battery 110 (step S13: NO), the driving support 124 assigns the EV mode to all of the sections (step S17), and ends the travel mode planning.

In contrast, in a case of determining that the total amount of the consumption energy of the sections is larger than the remaining charge of the battery 110 (step S13: YES), sections that are to be assigning candidates of the EV mode are specified as candidate sections from among all of the sections (step S14). The driving support 124 assigns the EV mode to the specified candidate sections, and assigns the HV mode to the rest of the sections (step S15).

Next, the driving support 124 determines whether or not the battery remaining charge is less than the total consumption energy of the sections set to the EV mode (step S16). In a case of determining that the remaining charge of the battery 110 is equal to or larger than the total consumption energy of the sections set to the EV mode (step S16: NO), the driving support 124 proceeds to step S14. That is, the mode planner 124a specifies EV mode candidate sections again in the case where the remaining charge of the battery 110 is insufficient.

In contrast, in a case of determining that the battery remaining charge is less than the total consumption energy of the sections set to the EV mode (step S16: YES), the driving support 124 ends the travel mode planning. The travel mode planning for each section in the travel route shown in FIG. 2 is performed by the aforementioned planning process.

Next, by referring to FIG. 4, an example of a travel mode setting in the hybrid controller 108 will be described. After the mode planner 124a of the driving support 124 has made a plan, the mode setter 108a of the hybrid controller 108 performs the travel mode setting planned by the mode planner 124a. A setting cycle, which is a cycle of setting performed by the mode setter 108a, is shorter than a planning cycle, which is a cycle of planning performed by the mode planner 124a.

Figure 4:
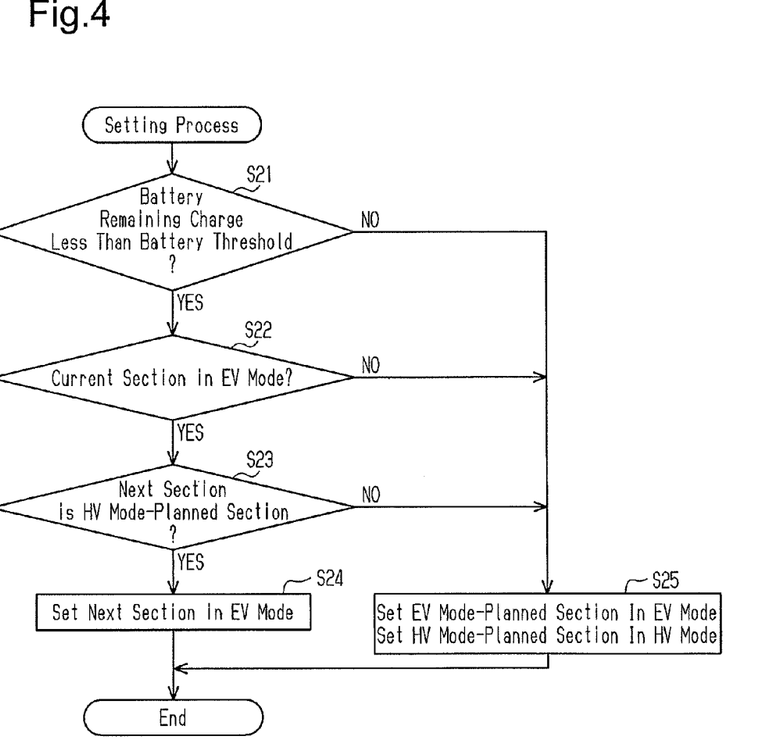
FIG. 4 is a flowchart showing a travel mode setting process by the travel support device of the first embodiment.

As shown in FIG. 4, when a travel mode is planned by the mode planner 124a, the mode setter 108a determines whether or not the remaining charge of the battery 110 is less than a threshold (step S21). That is, the mode setter 108a determines whether or not the remaining charge of the battery 110 is scarce. Then, in a case of determining that the remaining charge of the battery 110 is equal to or larger than the threshold (step S21: NO), the mode setter 108a sets, for the current section and the subsequent sections, the EV mode for the sections that have been planned to be in the EV mode by the mode planner 124a, and sets the sections that have been planned to be in the HV mode to the HV mode (step S25). That is, the mode setter 108a switches the travel modes in accordance with the travel modes planned by the mode planner 124a.

In contrast, in a case of determining that the remaining charge of the battery 110 is less than the threshold (step S21: YES), the mode setter 108a determines whether or not the travel mode of the currently traveling section is the EV mode (step S22). In a case of determining that the travel mode of the currently traveling section is not EV mode (Step S22: NO), the mode setter 108a proceeds to step S25.

Further, in a case of determining that the travel mode of the currently traveling section is the EV mode (Step S22: YES), the mode setter 108a determines whether or not the travel mode planned for the next section is the HV mode (step S23). That is, the mode setter 108a determines whether or not the planned travel mode will be switched from the EV mode to the HV mode when the travel section is changed. In a case of determining that the travel mode planned for the next section is not the HV mode (step S23: NO), the mode setter 108a proceeds to step S25.

Further, in a case of determining that the travel mode planned for the next section is the HV mode (Step S23: YES), the mode setter 108a sets the EV mode to the next section (step S24), and ends the travel mode setting. In a case where a section of which the travel mode is planned to be the EV mode is present in the subsequent sections, the mode setter 108a sets the travel mode of the section of which the travel mode is planned to be the EV mode to the HV mode.

Hereinbelow, operation of the embodiment will be described assuming that the vehicle 100 is traveling in a part of the second section k2 shown in FIG. 2 that is immediately before the third section k3. In this case, the remaining charge of the battery 110 is assumed to be less than the threshold. The mode setter 108a proceeds to step S22 since the remaining charge of the battery 110 is less than the threshold. Further, the mode setter 108a proceeds to step S23 since the currently traveling section is planned to be in the EV mode. Moreover, the mode setter 108a proceeds to step S24 since the next section is planned to be in the HV mode. Thus, as shown in FIG. 2, the vehicle 100 continues to travel in the EV mode even when it enters the third section k3 from the second section k2. Further, when the remaining charge of the battery 110 is used up, the traveling in the EV mode cannot be performed, so the vehicle travels in the HV mode. Further, although the travel mode of the fifth section k5 was planned to be the EV mode, the mode setter 108a sets the travel thereof set to the HV mode, and sets the travel mode to be displayed on the display 113 to be the EV mode as well.

In the present embodiment, as described above, when the section planned to be in the EV mode is switched to a section planned to be in the HV mode, the traveling in the EV mode is continued on condition that the remaining charge of the battery 110 is less than the threshold. Due to this, the battery 110 is used up, and the hunting of the travel modes is prevented. Thus, the travel support device, the travel support method, and a drive support system that support a vehicle to move through a smooth switching between the EV mode and the HV mode is provided.

As described above, according to the present embodiment, the following advantages are achieved.

(1) When an EV mode-planned section is switched to an HV mode-planned section, the travel mode is set such that the traveling in the EV mode is continued on condition that the remaining charge of the battery is less than the threshold. It is thus possible to avoid hunting of the travel modes, in which, for example, the traveling in the HV mode is switched to the traveling in the EV mode, and again switched immediately to the traveling in the HV mode upon switching because the remaining charge of the battery is scarce. Thus, smooth switching of the EV mode and the HV mode is realized.

(2) The travel modes of the sections planned to be in the EV mode after the section in which the traveling in the EV mode has been continued are set to the HV mode. Due to this, the travel mode can be made to be the HV mode in accordance with the remaining charge of the battery by which the traveling in the EV mode cannot be performed.

(3) The travel mode setting by the mode setter 108a is performed at a shorter cycle than the cycle of the travel mode planning by the mode planner 124a. Due to this, even if the remaining charge of the battery changes due to factors such as the traffic flow, a new suitable travel mode can be assigned by performing the travel mode setting at a relatively short cycle.

Second Embodiment

Figure 5:
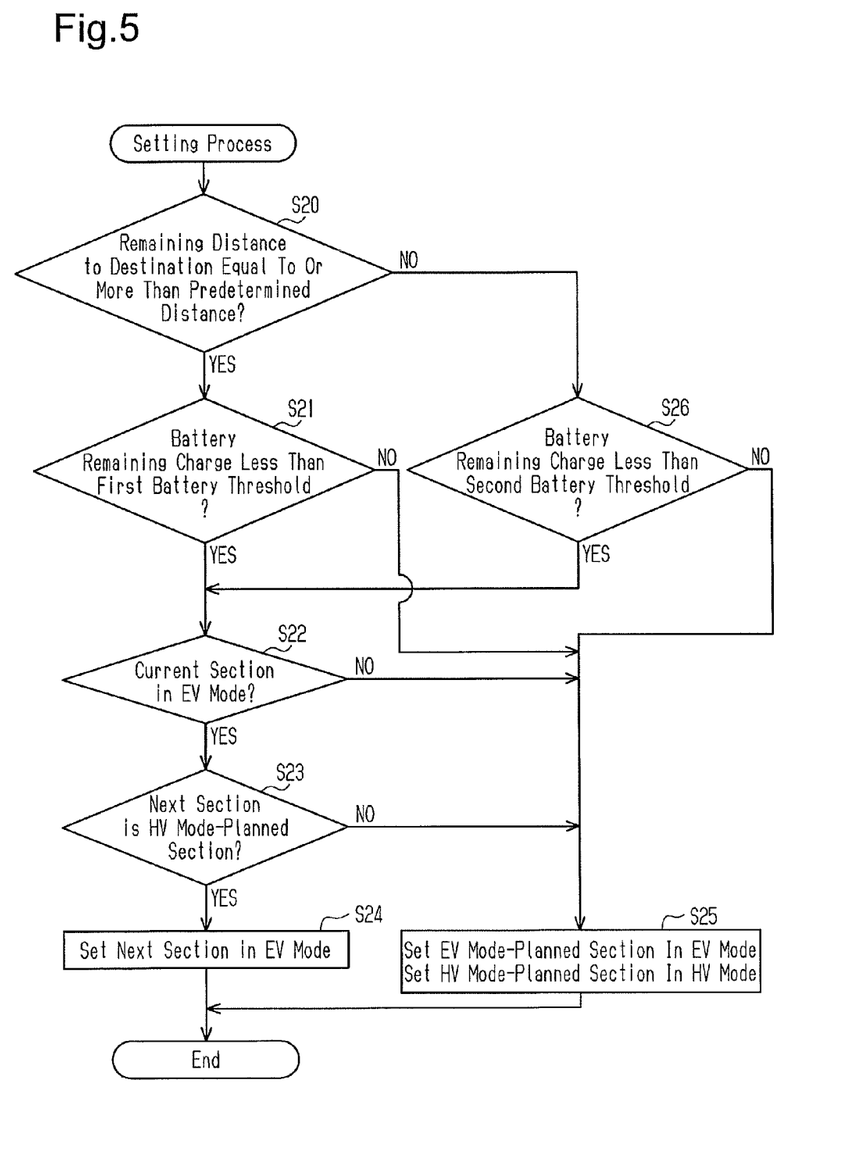
FIG. 5 is a flowchart showing a travel mode setting process by a travel support device of a second embodiment.

Hereinbelow, a travel support device, a travel support method, and a drive support system according to a second embodiment will be described with reference to FIG. 5. The travel support device and the travel support method of this embodiment differs from the first embodiment in that a threshold of a battery 110 is set in accordance with the remaining distance to a destination. Hereinbelow, the difference from the first embodiment will mainly be described.

In the present embodiment, the mode setter 108a regards the threshold of the battery 110 as a value that can absorb elements that change due to changes in the traveling environment of the vehicle 100, that is, influences of traveling states and the traffic flow. That is, as shown in FIG. 5, before determining whether or not the remaining charge of the battery 110 is less than the threshold in step S21, the mode setter 108a determines whether or not the remaining distance to the destination is equal to or more than a predetermined distance (step S20). Then, in a case where the remaining distance to the destination is equal to or more than the predetermined distance, the mode setter 108a sets a first threshold as the threshold of the battery 110, and sets a second threshold as the threshold of the battery 110 in a case where the remaining distance to the destination is less than the predetermined distance. Further, the first threshold is a value smaller than the second threshold. Further, the first threshold is a value corresponding to an increase in a changing amount of the remaining charge of the battery 110 for controlling to be at the remaining charge upon switching from an EV mode to an HV mode. Further, the second threshold is a value by which the remaining charge of the battery 110 will not be in excess due to factors such as variations in the traveling itself, variations in the traffic flow, and the like when the vehicle 100 travels.

Under such a condition, when a travel mode is planned by the mode planner 124a, the mode setter 108a firstly determines whether or not the remaining distance to the destination is equal to or more than the predetermined distance (step S20). In the case of determining that the remaining distance to the destination is less than the predetermined distance (step S20; NO), the mode setter 108a sets the second threshold as the threshold of the battery 110, and determines whether or not the remaining charge of the battery 110 is less than the second threshold (step S26). Then, in a case of determining that the remaining charge of the battery 110 is equal to or more than the second threshold (step S26: NO), the mode setter 108a proceeds to step S25. In a case of determining that the remaining charge of the battery 110 is less than the second threshold (step S26: YES), the mode setter 108a proceeds to step S22.

In contrast, in a case of determining that the remaining distance to the destination is equal to or more than the predetermined distance (step S20: YES), the mode setter 108a sets the first threshold as the threshold of the battery 110, and determines whether or not the remaining charge of the battery 110 is less than the first threshold (step S21). Then, in a case of determining that the remaining charge of the battery 110 is equal to or more than the first threshold (step S21: NO), the mode setter 108a proceeds to step S25. In a case of determining that the remaining charge of the battery 110 is less than the first threshold (step S21: YES), the mode setter 108a proceeds to step S22.

As described above, according to the present embodiment, the following advantages can be achieved in addition to the advantages (1) to (3) of the first embodiment.

(4) When the remaining distance to the destination is less than the predetermined distance, that is, when the destination is close to the current location, the threshold for the remaining charge of the battery 110 is set to a relatively large value. Due to this, the traveling in the EV mode is more likely to be continued, and a so-called battery surplus is avoided.

(5) The threshold of the battery 110 is set to a value that may absorb elements that change due to changes in a traveling environment of the vehicle 100, that is, influences of the traveling states and the traffic flow. Due to this, even if the remaining charge of the battery 110 changes by the influences of the traveling state of the vehicle 100 and the traffic flow, such changes can be coped with.

The above embodiments may be modified according to the following configurations.

In the above embodiments, the case in which the on-vehicle network is CAN is described. However, the invention is not limited to this, and the on-vehicle network may consist of any network, such as Ethernet (registered trademark), FlexRay (registered trademark), or IEEE 1394 (FireWire (registered trademark)), as long as it can connect the devices such as the ECU in a communicable manner. Further, it may be configured by including a CAN and having other networks combined thereto. This improves the flexibility of configuration in the vehicle in which the travel support device is used.

In the above embodiments, the case in which the navigation system 112 and the driving support 124 are different configurations is described. However, the invention is not limited to this, and the navigation system and the drive supporting section may be provided in the same device. This improves the flexibility of configuration in the travel support device.

In the above embodiments, the case in which the hybrid controller 108 and the driving support 124 are different configurations is described. However, the invention is not limited to this, and the hybrid controller and the drive supporting section may be provided in the same device. This improves the flexibility of configuration in the travel support device.

In the above embodiments, the case in which the respective devices such as the navigation system 112, the display 113, and the on-vehicle controller 120 are provided integrally in the vehicle 100 is described. However, the invention is not limited to this, and a portable information processing device and the like such as a cell phone or a smartphone as an entirety or a part of such functions may be used, so long as the respective devices such as the navigation system, the display, and the on-vehicle controller are connected to each other in a communicable manner. This improves the flexibility of design of the travel support device.

In the above embodiment, the case in which the driving support 124, the navigation system 112, the map information database 111, and the like are installed in the vehicle 100 is described. However, the invention is not limited to this, and a part of functions such as the drive supporting section, the navigation system, and the map information database may be provided in an information processor outside the vehicle, or in a portable information processing device. As an information processing device outside the vehicle, an information processing center may be exemplified, and as a portable information processor, a terminal such as a cell phone, or a smartphone can be exemplified. As with the information processor outside the vehicle, information may be received via a wireless communication line. As with the portable information processor, it may connect to the on-vehicle network, may be connected by a short-range communication, or may transmit and receive information via the wireless communication line. This improves the flexibility of design of the travel support device.

In the above embodiments, the case in which the road loads of the sections in the travel route are acquired or computed from the information included in the map information database is described. However, the invention is not limited to this, and the road loads of the sections in the travel route may be acquired or computed from a learning database. For example, for a route that had once been traveled, the road loads required in the route stored in the learning database may be utilized. This improves the flexibility of design of the travel support device.

In the above embodiments, the cases are described in which EV mode is assigned to sections in the order from the lowest road load. However, the invention is not limited this, and the EV mode may be assigned to the respective sections by making determinations based on one or more pieces of information included in map data, such as road gradients, legal speed limits, road types, and the like, as long as the assignment of the EV mode can be performed suitably. Further, the EV mode may be assigned to the respective sections based on the efficiency of the internal combustion engine or the efficiency of the battery. This improves the flexibility of design of the travel support device.

Figure 6:
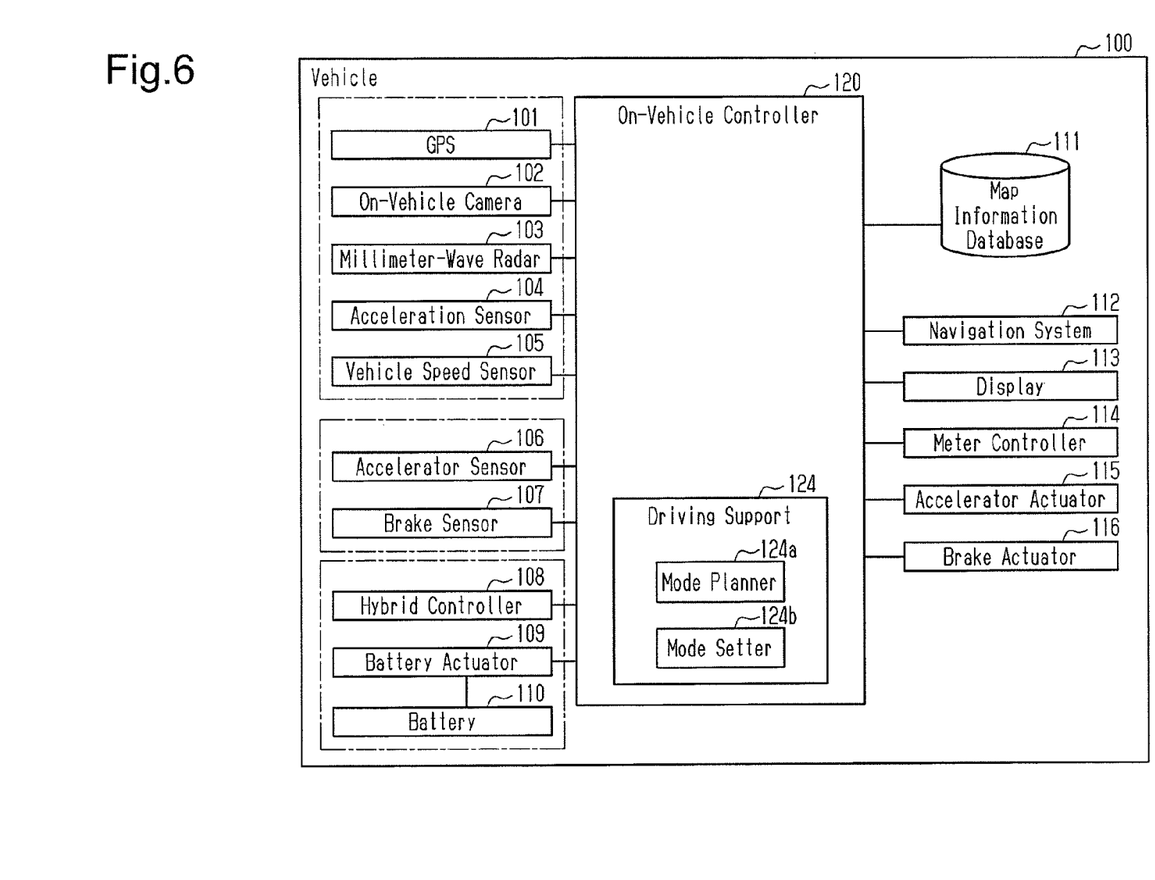
FIG. 6 is a block diagram showing a schematic configuration of a travel support device according to a modification.

In the above embodiments, the cases are described in which the setting of the planned travel modes is performed by the hybrid controller 108 (mode setter 108*a*). However, the invention is not limited this, and as shown in FIG. 6, the settings of the planned travel modes may be performed by the driving support 124 (mode setter 124*b*). This improves the flexibility of design of the travel support device.

In each of the above embodiments, the cases are described in which the assignment of the travel modes is performed by the driving support 124. However, the invention is not limited this, and the assignment of the travel mode may be performed by the hybrid controller and the like. This improves the flexibility of design of the travel support device.

In the above embodiments, primarily, the cases are described in which the assignment of the travel modes is performed when the location of the vehicle 100 is at the current location. However, the assignment of the travel modes may be performed at any location while the vehicle is moving toward the destination. Further, the appropriate assignment of the travel modes can be performed at all sections in the travel route regardless of the location where the assignment is performed. This improves the flexibility of design of the travel support device.

In the above embodiments, the hypothetical road loads are set with smaller value in the order from sections close to the current location of the travel route. However, the hypothetical road loads having the same value may be set.

In each of the above embodiments, the consumption energy is added up in the order from the sections close to the current location in the travel route, and a hypothetical road load is set for sections of which the added-up consumption energy is larger than an energy threshold. The travel mode of the section with a relatively low road load including the hypothetical road load is planned to be the EV mode. However, the sections before the section where regeneration energy can be obtained may be set to the HV mode.

In each of the above embodiments, the distance to the destination being equal to or more than the predetermined distance is used as a condition for planning the HV mode with priority for the sections near the current location. However, this condition may be omitted in a case where the HV mode is planned with priority for sections near the current location regardless of the distance to the destination.

In each of the above embodiments, the display of the travel modes is made to be the HV mode for all of the travel sections after having traveled continuously in the EV mode in the travel sections that were planned to be in the HV mode. However, the change in the display may be omitted in a case where the load of the display changing process is large.

In each of the above embodiments, the setting cycle, which is the cycle for setting the planned travel modes, is set to be a shorter cycle than the planning cycle, which is a cycle for planning the travel modes. However, if the planning cycle is sufficiently short, the setting cycle and the planning cycle may be the same.

The invention claimed is:

1. A travel support device that supports a vehicle having an internal combustion engine and a motor, which uses a battery, as drive sources to move from a current location to a destination, wherein
a travel route from the current location to the destination is divided into a plurality of sections,
travel modes of the vehicle include an electric vehicle mode, which uses the motor as the drive source, and a hybrid vehicle mode, which uses at least the internal combustion engine as the drive source,
a road load for traveling each section in the electric vehicle mode is set,
the travel support device comprising:
a planner that plans, for each section, the travel mode by selecting one of the electric vehicle mode and the hybrid vehicle mode; and
a setter, wherein when a planned section of the travel mode transitions from an electric vehicle mode-planned section to a hybrid vehicle mode-planned section, the setter sets the travel mode to continue traveling in the electric vehicle mode in the hybrid vehicle mode-planned section on condition that a remaining charge of the battery is less than a threshold.

2. The travel support device according to claim 1, wherein the threshold for the remaining charge of the battery when the distance from the current location to the destination is less than a predetermined distance is set to a value larger than that when the distance is equal to or greater than the predetermined distance.

3. The travel support device according to claim 2, wherein the threshold for the remaining charge of the battery is set as a value capable of absorbing changes in a traveling environment of the vehicle.

4. The travel support device according to claim 1, wherein, for sections subsequent to a section in which the setter has set the travel mode from the hybrid vehicle mode to the electric vehicle mode, the setter sets, to the hybrid vehicle mode, the travel mode of a section for which the electric vehicle mode has been planned.

5. The travel support device according to claim 1, wherein the travel mode setting by the setter is performed after the travel mode planning for the vehicle by the planner and at a shorter cycle than the cycle of the planning by the planner.

6. The travel support device according to claim 1, wherein
the travel support device is a part of a drive support system that supports driving of a vehicle based on one travel mode selected from among a plurality of different travel modes planned for each of a plurality of sections that are obtained by dividing the travel route from the current location to the destination of the vehicle including an internal combustion engine and a motor as drive sources, and
the travel support device plans one travel mode selected from among the plurality of travel modes for each section in the travel route and sets the travel mode as needed.

7. A travel support method for supporting a movement of a vehicle having an internal combustion engine and a motor, which uses a battery, as drive sources from a current location to a destination, wherein
a travel route from the current location to the destination is divided into a plurality of sections,
travel modes of the vehicle include an electric vehicle mode, which uses the motor as the drive source, and a hybrid vehicle mode, which uses at least the internal combustion engine as the drive source,
a road load for traveling each section in the electric vehicle mode is set,
the travel support method comprising:
planning the travel mode by selecting one of the electric vehicle mode and the hybrid vehicle mode; and
when a planned section of the travel mode transitions from an electric vehicle mode-planned section to a hybrid vehicle mode-planned section, setting the travel mode to continue traveling in the electric vehicle mode in the hybrid vehicle mode-planned section on condition that a remaining charge of the battery is less than a threshold.

8. The travel support method according to claim 7, wherein the threshold for the remaining charge of the battery when the distance from the current location to the destination is less than a predetermined distance is set to a value larger than that when the distance is equal to or greater than the predetermined distance.

9. The travel support method according to claim 7, further comprising, for sections subsequent to a section in which the travel mode is set from the hybrid vehicle mode to the electric vehicle mode, setting, to the hybrid vehicle mode, the travel mode of a section for which the electric vehicle mode has been planned.

10. A drive support system that supports driving of a vehicle based on one travel mode selected from among a plurality of different travel modes, the selected mode having been planned for each of a plurality of sections that are obtained by dividing a travel route from a current location to a destination of the vehicle including an internal combustion engine and a motor as drive sources, the drive support system comprising:
  the travel support device according to claim 1, as a travel support device for planning the one travel mode selected from among the plurality of travel modes for each section of the travel route and setting the travel mode as needed.

* * * * *